(12) United States Patent
Hamooni et al.

(10) Patent No.: US 11,334,892 B2
(45) Date of Patent: May 17, 2022

(54) SYSTEM, METHOD, AND COMPUTER PROGRAM PRODUCT TO DETERMINE CUISINE TYPE CLASSIFIERS

(71) Applicant: Visa International Service Association, San Francisco, CA (US)

(72) Inventors: Hossein Hamooni, Santa Clara, CA (US); Himel Dev, Champaign, IL (US)

(73) Assignee: Visa International Service Association, San Francisco, CA (US)

( * ) Notice: Subject to any disclaimer, the term of this patent is extended or adjusted under 35 U.S.C. 154(b) by 261 days.

(21) Appl. No.: 16/667,065

(22) Filed: Oct. 29, 2019

(65) Prior Publication Data

US 2020/0134627 A1    Apr. 30, 2020

Related U.S. Application Data

(60) Provisional application No. 62/751,883, filed on Oct. 29, 2018.

(51) Int. Cl.
*G06Q 40/00*    (2012.01)
*G06Q 20/40*    (2012.01)
*G06Q 50/12*    (2012.01)

(52) U.S. Cl.
CPC ..... *G06Q 20/4014* (2013.01); *G06Q 20/4016* (2013.01); *G06Q 50/12* (2013.01)

(58) Field of Classification Search
CPC . G06Q 20/4014; G06Q 20/4016; G06Q 50/12
See application file for complete search history.

(56) References Cited

U.S. PATENT DOCUMENTS 10,740,852 B1 *    8/2020    George ............... G06Q 40/12
10,949,825 B1 *    3/2021    Brosamer ............ G06Q 30/04
(Continued)

FOREIGN PATENT DOCUMENTS

WO    WO-2019155220 A1 *    8/2019    ............... G06K 9/66

OTHER PUBLICATIONS

Hossain et al., "Machine Learning Based Class Level Prediction of Restaurant Reviews," 2017 IEEE Region 10 Humanitarian Technology Conference, Dhaka, Bangladesh, 2017 (Year: 2017).*
(Continued)

*Primary Examiner* — Alexander G Kalinowski
*Assistant Examiner* — William B. Bunker
(74) *Attorney, Agent, or Firm* — The Webb Law Firm

(57) ABSTRACT

Provided is a method that includes determining cuisine type classifiers based on merchant data, receiving transaction data associated with each payment transaction of a plurality of payment transactions involving a plurality of merchants and a plurality of consumers; determining, with at least one processor, a plurality of cuisine type labels based on a plurality of merchant names associated with the plurality of payment transactions or a portion of the plurality of payment transactions, wherein a cuisine type label identifies a cuisine type provided by a respective merchant of the plurality of merchants; generating a merchant cuisine type model from the transaction data to determine a cuisine type label of a merchant, the merchant cuisine type model based on the transaction data, and makes an inference based on a combination of merchant or consumer features associated with a payment transaction of the plurality of payment transactions; and automatically predicting one or more cuisine type classifications using the merchant cuisine type model based on one or more payment transactions associated with a
(Continued)

consumer. A system and a computer program product are also disclosed.

20 Claims, 4 Drawing Sheets

(56) References Cited

U.S. PATENT DOCUMENTS

| | | | | |
|---|---|---|---|---|
| 2010/0106568 | A1* | 4/2010 | Grimes | G06Q 30/0254 705/14.1 |
| 2011/0178849 | A1* | 7/2011 | Rane | G06Q 30/02 705/7.31 |
| 2013/0231976 | A1* | 9/2013 | Tavares | G06Q 30/0201 705/7.34 |
| 2016/0098747 | A1* | 4/2016 | Bhagchandani | G06Q 30/0254 705/14.52 |
| 2016/0232624 | A1* | 8/2016 | Goldberg | G06Q 30/02 |
| 2017/0097967 | A1* | 4/2017 | Savliwala | G06Q 30/02 |
| 2017/0262874 | A1* | 9/2017 | Pandey | G06Q 30/0204 |
| 2019/0130448 | A1* | 5/2019 | Kairinos | G06Q 30/0261 |
| 2020/0250185 | A1* | 8/2020 | Anderson | G06F 16/2358 |

OTHER PUBLICATIONS

Mark Nelson, Visa, "Outsmarting Fraudsters with Advanced Analytics," https://usa.via.com/visa - everywhere; Jul. 3, 2017 (Year: 2017).*
Prakhash et al., "Categorizing Food Names in Restaurant Reviews," IEEE 978-1-5090-0645-8/16. 2016 (Year: 2016).*
Ahn et al., "Flavor network and the principles of food pairing", 2011, Scientific Reports, 21 pages.
Bakhshi et al., "Demographics, Weather and Online Reviews: A Study of Restaurant Recommendations", 2014, In Proceedings of the 23rd International Conference on World Wide Web (WWW '14), 11 pages.
Barber et al., "Restaurant consumers repeat patronage: A service quality concern", 2011, International Journal of Hospitality Management, 8 pages.
Chen et al., "The impacts of different types of cuisines and restaurants on gratuities", 2017, Journal of Revenue and Pricing Management, 1 page.
Cheng et al., "Wide & Deep Learning for Recommender Systems", 2016, In Proceedings of the 1st Workshop on Deep Learning for Recommender Systems (DLRS 2016), 4 pages.
Clark et al., "Consumer loyalty in the restaurant industry—a preliminary exploration of the issues", 1999, British Food Journal, 1 page.
Fine, "Organizational Time: Temporal Demands and the Experience of Work in Restaurant Kitchens", 1990, Social Forces, 1 page.
Grbovic et al., "E-commerce in Your Inbox: Product Recommendations at Scale", 2015, In Proceedings of the 21th ACM SIGKDD International Conference on Knowledge Discovery and Data Mining (KDD '15), 10 pages.
Guo et al., "DeepFM: A Factorization-Machine based Neural Network for CTR Prediction", 2017, In Proceedings of the 26th International Joint Conference on Artificial Intelligence (IJCAI'17), 7 pages.
Gupta et al., "Improved Pattern Learning for Bootstrapped Entity Extraction", 2014, In Proceedings of the Eighteenth Conference on Computational Natural Language Learning, 11 pages.

He et al., "Deep Residual Learning for Image Recognition", 2016, In The IEEE Conference on Computer Vision and Pattern Recognition (CVPR), 9 pages.
Kimes et al., "The Impact of Restaurant Table Characteristics on Meal Duration and Spending", 2004, Cornell Hotel and Restaurant Administration Quarterly, 16 pages.
Kimes et al., "Restaurant Revenue Management at Chevys: Determining the Best Table Mix", 2004, Decision Sciences, 22 pages.
Le et al., "Distributed Representations of Sentences and Documents", 2014, In Proceedings of the 31st International Conference on International Conference on Machine Learning, 9 pages.
Lee et al., "Popular Ethnic Foods in the United States: A Historical and Safety Perspective", 2014, Comprehensive Reviews in Food Science and Food Safety, 32 pages.
Lian et al., "Restaurant Survival Analysis with Heterogeneous Information", 2017, In Proceedings of the 26th International, Conference on World Wide Web Companion (WWW'17 Companion), 10 pages.
Mikolov et al., "Distributed Representations of Words and Phrases and their Compositionality", 2013, In Proceedings of the 26th International Conference on Neural Information Processing Systems, 9 pages.
Muller, "A Simple Measure of Restaurant Efficiency", 1999, Cornell Hotel and Restaurant Administration Quarterly, 7 pages.
Park, "Ethnic Foodscapes: Foreign Cuisines in the United States", 2017, Food, Culture & Society, 30 pages.
Qu, "Determinant Factors and Choice Intention for Chinese Restaurant Dining: A Multivariate Approach", 1997, Journal of Restaurant & Foodservice Marketing, 4 pages.
Ray, "The Ethnic Restaurateur", 2016, Bloomsbury Publishing, 1 page.
Ryu et al., "New or repeat customers: How does physical environment influence their restaurant experience?", 2011, International Journal of Hospitality Management, 13 pages.
Sajadmanesh et al., "Kissing Cuisines: Exploring Worldwide Culinary Habits on the Web", 2017, In Proceedings of the 26th International Conference on World Wide Web Companion, International World Wide Web Conferences Steering Committee, 9 pages.
Schlosser, "Fast Food Nation: The Dark Side of the All-American Meal", 2012, Houghton Mifflin Harcourt, 4 pages.
She et al, "What Cuisine Do You Like?: Improving Dining Preference Prediction through Physical Social Locations", 2012, In Green Computing and Communications (GreenCom), 4 pages.
Somashekhar, "Ethnic economies in the age of retail chains: comparing the presence of chain-affiliated and independently owned ethnic restaurants in ethnic neighbourhoods", 2018, Journal of Ethnic and Migration Studies, 6 pages.
Wang et al., "Deep & Cross Network for Ad Click Predictions", 2017, In Proceedings of the ADKDD'17 (ADKDD'17), 7 pages.
Yan et al., "A Biterm Topic Model for Short Texts", 2013, In Proceedings of the 22Nd International Conference on World Wide Web (WWW '13), 11 pages.
Yim et al., "Determinants of a restaurant average meal price: An application of the hedonic pricing model", 2014, International Journal of Hospitality Management, 3 pages.
Zhang et al., "Exploiting Dining Preference for Restaurant Recommendation", 2016, In Proceedings of the 25th International Conference on World Wide Web (WWW'16), International World Wide Web Conferences Steering Committee, 11 pages.

* cited by examiner

SYSTEM, METHOD, AND COMPUTER PROGRAM PRODUCT TO DETERMINE CUISINE TYPE CLASSIFIERS

CROSS REFERENCE TO RELATED APPLICATION

This application claims priority to U.S. Provisional Patent Application No. 62/751,883, filed Oct. 29, 2018, the disclosure of which is hereby incorporated by reference in its entirety.

BACKGROUND

1. Field

This disclosure relates generally to a merchant classification system and, in one particular embodiment, to a method, system, and computer program product for determining cuisine type classifiers for merchants using only merchant transaction data.

2. Technical Considerations

Data is emerging as a powerful tool in the increasingly competitive market for the restaurant consumer. An explosion of food merchants is providing more data sources, while providing diners more cuisine choices than ever. Likewise, some restaurants say using consumer data to suit the tastes of their consumers can give them a leg up. However, as the total number of consumers of restaurant cuisine (e.g., restaurant traffic) has not grown, the total number of restaurants has continued to grow, and the adjustment of offerings for giving consumers a better overall experience must continually adapt as retention cannot rest merely on the hope that consumers will simply continue to return.

With the advent of the mobile age, mobile apps, and digital reservation systems for tracking and sharing consumer preferences and spending habits, billions of restaurant orders are now placed and generated digitally. Digital orders are becoming ever more popular as access to mobile apps, text messages, and the internet each account for a rising share of all restaurant orders.

Campaigns to incentivize targeted consumers to take an action can be readily offered and implemented in apps, as well as in stores. Consumer data collected through different programs includes loyalty and delivery data, as well as when diners sign up for an online account. However, companies face challenges identifying consumers which are relevant to specific targets because the collection and use of loyalty data frequently only offers a vague understanding of consumer habits, or is limited or unavailable for many consumers.

Moreover, consumers are often equally disappointed when they continue to receive offers in which they are not interested. This can happen when companies that collect email addresses without logging specific purchases send out generic emails, untargeted or inaccurate offers, and/or one-size-fits-all promotions to an entire consumer base. For example, a consumer that primarily eats Southeast Asian food may not need, or be satisfied with, an offer for discounted fast food, expensive European cuisine, or any other unrelated cuisine type.

SUMMARY

Accordingly, disclosed are systems, devices, products, apparatuses, and/or methods for determining cuisine type classifiers.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

Further, Non-Limiting Aspects or Embodiments are Set Forth in the Following Numbered Clauses:

Clause 1: A computer-implemented method comprising: receiving, with at least one processor, transaction data of a plurality of payment transactions involving a plurality of merchants and a plurality of consumers; determining, with at least one processor, a plurality of cuisine type labels based on a plurality of merchant names associated with the plurality of payment transactions or a portion of the plurality of payment transactions, wherein a cuisine type label identifies a cuisine type provided by a respective merchant of the plurality of merchants; generating, with at least one processor, a cuisine type model from the transaction data to determine the cuisine type label of the merchant, wherein the cuisine type model is generated based on the transaction data to provide inferences based on one or more of merchant or consumer features associated with a payment transaction of the plurality of payment transactions; and automatically predicting, with at least one processor, one or more cuisine type classifications using the cuisine type model based on one or more payment transactions associated with the consumer.

Clause 2: The computer-implemented method of clause 1, further comprising: generating, with at least one processor, a recommendation based on the one or more cuisine type classifications.

Clause 3: The computer-implemented method of clauses 1 or 2, further comprising: detecting, with at least one processor, a payment fraud based at least partially on the one or more cuisine type classifications.

Clause 4: The computer-implemented method of any of clauses 1-3, wherein the transaction data associated with the payment transaction comprises at least one of: data associated with an identification of the consumer controlling an account associated with the payment transaction; data associated with the merchant in the payment transaction; data associated with a location of the merchant in the payment transaction; data associated with a time interval at which the payment transaction occurred; data associated with an authorized transaction amount of the payment transaction; or data associated with a settlement transaction amount of the payment transaction.

Clause 5: The computer-implemented method of any of clauses 1-4, further comprising: determining the cuisine type label of the plurality of cuisine type labels for at least one merchant for the payment transaction of the consumer based on one or more characteristics in the payment transaction associated with the at least one merchant and the consumer.

Clause 6: The computer-implemented method of any of clauses 1-5, wherein making the inference based on the combination of the merchant or consumer features associated with the payment transaction of the plurality of payment transactions comprises: determining merchant attributes by encoding a plurality of consumer embeddings of a respective plurality of consumers of the merchant; determining consumer characteristics by encoding a plurality of merchant embeddings for the consumer; and determining compatibility between the merchant and a consumer based on the similarity of characteristics of the consumer to the merchant attributes.

Clause 7: The computer-implemented method of any of clauses 1-6, wherein the merchant or consumer are business features comprising at least one of: an authorized amount percentile per payment transaction for the merchant; a tip percentile per payment transaction for the merchant; an hourly transaction percentile based on a number of payment transactions conducted in an hourly time interval for the merchant; a party size distribution per payment transaction for the merchant; a mean cost per payment transaction based on expected party size for the merchant; a distribution of a number of payment transactions conducted based on days-of-week for the merchant; a distribution of a number of transactions conducted based on hours-of-day during a weekday for the merchant; or a distribution of a number of transactions conducted based on hours-of-day during a weekend day for the merchant.

Clause 8: The computer-implemented method of any of clauses 1-7, wherein determining the plurality of cuisine type labels comprises: determining a label of a merchant name associated with the payment transaction by satisfying criteria including at least one of support, confidence, or a significance of a word within the merchant name of the plurality of merchants.

Clause 9: The computer-implemented method of any of clauses 1-8, predicting the one or more cuisine type classifications using the cuisine type model, further comprises: determining a plurality of merchant features based on transaction data associated with a portion of payment transactions of the plurality of payment transactions associated with the consumer.

Clause 10: A computing system comprising: one or more processors programmed or configured to: receive transaction data of a plurality of payment transactions involving a plurality of merchants and a plurality of consumers; determine a plurality of cuisine type labels based on a plurality of merchant names associated with the plurality of payment transactions or a portion of the plurality of payment transactions, wherein a cuisine type label identifies a cuisine type provided by a respective merchant of the plurality of merchants; generate a cuisine type model from the transaction data to determine the cuisine type label of the merchant, wherein the cuisine type model is generated based on the transaction data to provide inferences based on one or more of merchant or consumer features associated with a payment transaction of the plurality of payment transactions; and automatically predict one or more cuisine type classifications using the cuisine type model based on one or more payment transactions associated with the consumer.

Clause 11: The computing system of clause 10, further configured to: generate a recommendation based on the one or more cuisine type classifications.

Clause 12: The computer-implemented method of clauses 10 or 11, further configured to: detect a payment fraud based at least partially on the one or more cuisine type classifications.

Clause 13: The computing system of any of clauses 10-12, wherein the transaction data associated with the payment transaction comprises at least one of: data associated with an identification of the consumer controlling an account associated with the payment transaction; data associated with the merchant in the payment transaction; data associated with a location of the merchant in the payment transaction; data associated with a time interval at which the payment transaction occurred; data associated with an authorized transaction amount of the payment transaction; or data associated with a settlement transaction amount of the payment transaction.

Clause 14: The computing system of any of clauses 10-13, further configured to: determine the cuisine type label of the plurality of cuisine type labels for at least one merchant for the payment transaction of the consumer based on one or more characteristics in the payment transaction associated with the at least one merchant and the consumer.

Clause 15: The computing system of any of clauses 10-14, wherein the one or more processors making the inference based on the combination of the merchant or consumer features associated with the payment transaction of the plurality of payment transactions are further configured to: determine merchant attributes by encoding a plurality of consumer embeddings of a respective plurality of consumers of the merchant; determine consumer characteristics by encoding a plurality of merchant embeddings for the consumer; and determine compatibility between the merchant and a consumer based on the similarity of characteristics of the consumer to the merchant attributes.

Clause 16: The computing system of any of clauses 10-15, wherein the merchant or consumer are business features comprising at least one of: an authorized amount percentile per payment transaction for the merchant; a tip percentile per payment transaction for the merchant; an hourly transaction percentile based on a number of payment transactions conducted in an hourly time interval for the merchant; a party size distribution per payment transaction for the merchant; a mean cost per payment transaction based on expected party size for the merchant; a distribution of a number of payment transactions conducted based on days-of-week for the merchant; a distribution of a number of transactions conducted based on hours-of-day during a weekday for the merchant; or a distribution of a number of transactions conducted based on hours-of-day during a weekend day for the merchant.

Clause 17: The computing system of any of clauses 10-16, wherein the one or more processors when determining the plurality of cuisine type labels are further configured to: determine a label of a merchant name associated with the payment transaction by satisfying criteria including at least one of support, confidence, or a significance of a word within the merchant name of the plurality of merchants.

Clause 18: The computing system of any of clauses 10-17, wherein the one or more processors predicting the one or more cuisine type classifications using the cuisine type model are further configured to: determine a plurality of merchant features based on transaction data associated with a portion of payment transactions of the plurality of payment transactions associated with the consumer.

Clause 19: A computer program product including at least one non-transitory computer-readable medium including one or more instructions that, when executed by at least one processor, cause the at least one processor to: receive transaction data of a plurality of payment transactions involving a plurality of merchants and a plurality of consumers; determine a plurality of cuisine type labels based on a plurality of merchant names associated with the plurality of payment transactions or a portion of the plurality of payment transactions, wherein a cuisine type label identifies a cuisine type provided by a respective merchant of the plurality of merchants; generate a cuisine type model from the transaction data to determine the cuisine type label of the merchant, wherein the cuisine type model is generated based on the transaction data to provide inferences based on one or more of merchant or consumer features associated with a payment transaction of the plurality of payment transactions; and automatically predict one or more cuisine type classifications using the cuisine type model based on one or more payment transactions associated with the consumer.

Clause 20: The computer program product of clause 19, wherein the at least one non-transitory computer-readable medium further includes one or more instructions that, when executed by at least one processor, cause the at least one processor to: determine the cuisine type label of the plurality of cuisine type labels for at least one merchant for the payment transaction of the consumer based on one or more characteristics in the payment transaction associated with the at least one merchant and the consumer.

BRIEF DESCRIPTION OF THE DRAWINGS

Additional Advantages and Details of the Disclosure are Explained in Greater Detail Below with Reference to the Exemplary Embodiments that are Illustrated in the Accompanying Schematic Figures, in which.

DESCRIPTION

Figure 1:
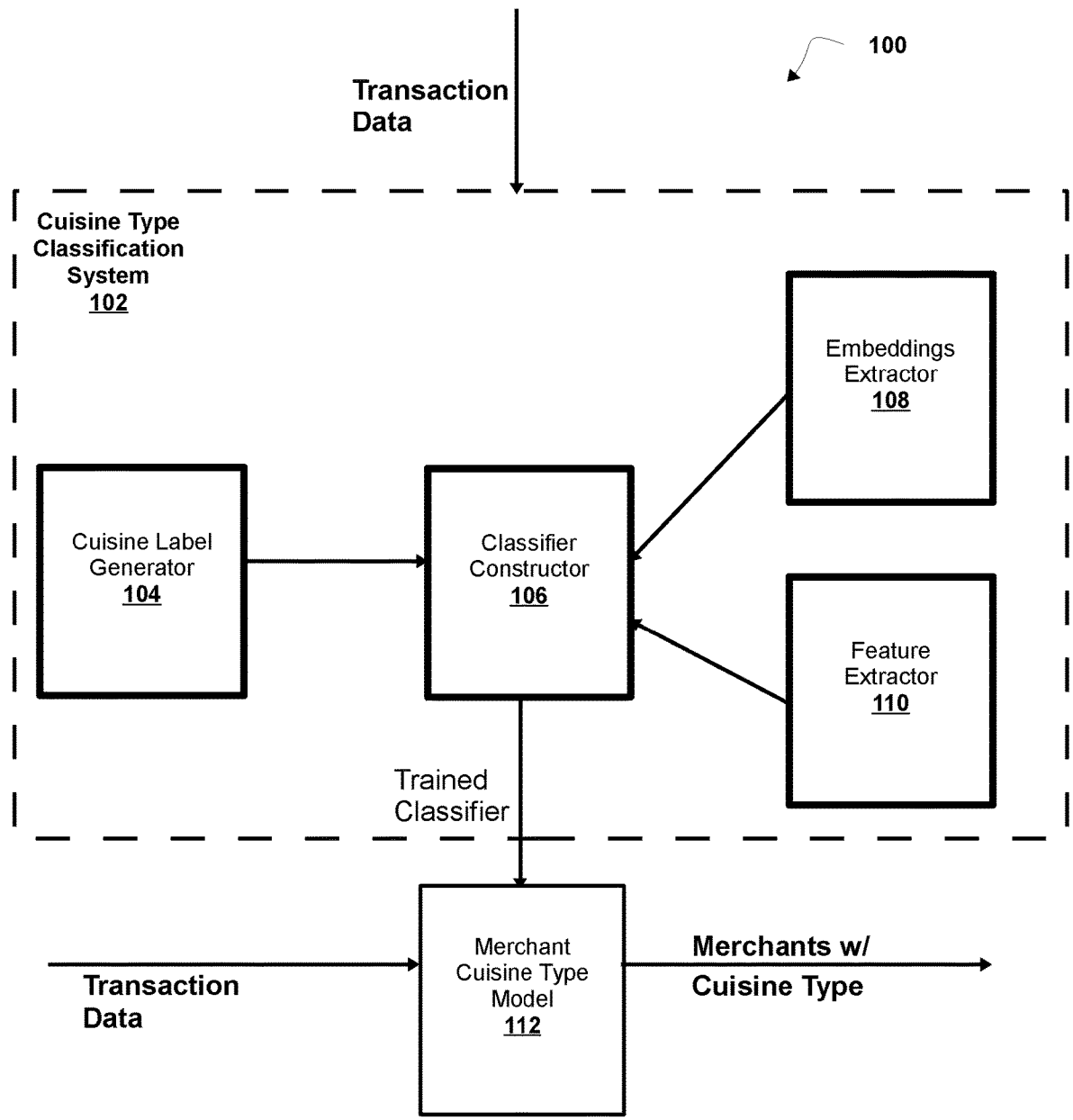
FIG. 1 is a diagram of a non-limiting embodiment or aspect of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "issuer," or "issuer bank" may refer to one or more entities that provide accounts to users for conducting transactions (e.g., payment transactions), such as initiating credit and/or debit payments. For example, an issuer institution may provide an account identifier, such as a primary account number (PAN), to a user that uniquely identifies one or more accounts associated with that user. The account identifier may be embodied on a payment device, such as a physical financial instrument (e.g., a payment card), and/or may be electronic and used for electronic payments. In some non-limiting embodiments, an issuer institution may be associated with a bank identification number (BIN) that uniquely identifies the issuer institution. As used herein "issuer institution system" may refer to one or more computer systems operated by or on behalf of an issuer institution, such as a server executing one or more software applications. For example, an issuer institution system may include one or more authorization servers for authorizing a transaction.

As used herein, the term "account identifier" may refer to one or more types of identifiers associated with a user account (e.g., an account identifier, a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a payment device, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier)

that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a consumer, a payment card user, a customer of a merchant, account holder, etc.) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. In some non-limiting embodiments, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments, a computing device may include a server, a desktop computer, and/or the like.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. The term "computing system" may include one or more computing devices or computers. The terms "application" or "application program interface" (API) refers to computer code or other data sorted on a computer-readable medium that may be executed by a processor to facilitate the interaction between software components, such as a client-side front-end and/or server-side back-end for receiving data from the client. The term "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system".

As used herein, the term "acquirer" may refer to an entity licensed by the transaction service provider and approved by the transaction service provider to originate transactions (e.g., payment transactions) using a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a payment device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the terms "client" and "client device" may refer to one or more client-side devices or systems, remote from a transaction service provider, used to initiate or facilitate a transaction. As an example, a "client device" may refer to one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), PDAs, and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices. It will be appreciated that various other arrangements are possible. As used herein, the term "system" may refer to one or more computing devices or combinations of computing devices, such as but not limited to processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments, computer-implemented methods, systems, and computer program products are disclosed. For example, a computer implemented method for determining the feature importance of a feature of a machine learning model may include determining a plurality of features of a dataset associated with a machine learning model that has been trained, determining a value of at least one feature of the plurality of features in each data record of a plurality of data records in the dataset, calculating an average value of the values of the at least one feature in each data record of the plurality of data records in the dataset, replacing an original value of the at least one feature in each data record of the plurality of data records in the dataset with the average value of the values of the at least one feature in each data record of the plurality of data records in the dataset, and determining a metric of model performance of the machine learning model based on the dataset that includes the original value of the at least one feature in each data record of the plurality of data records in the dataset replaced with the average value of the values of the at least one feature in each data record of the plurality of data records in the dataset.

In this way, non-limiting embodiments of the present disclosure may allow for determining feature importance of at least one feature of a machine learning model independent of re-training the machine learning model for each feature of a plurality of features in a dataset. In addition, non-limiting embodiments of the present disclosure may more accurately determine feature importance of the at least one feature of the machine learning model independent than re-training the machine learning model more than once for each feature of the plurality of features in the dataset to determine the importance of a feature. Further, by removing features that are determined to be less important than other features before training a machine learning model, the accuracy of a machine learning model may be improved, while simultaneously reducing the runtime for one or more actions performed using the machine learning model.

Non-limiting embodiments or aspects of the present disclosure are directed to merchant classification systems, methods, and computer program products for generating cuisine types for merchants and cuisine type classifiers using only merchant transaction data. In some non-limiting embodiments, a method for determining cuisine type classifiers based on merchant data includes: receiving transaction data associated with each payment transaction of a plurality of payment transactions involving a plurality of merchants and a plurality of consumers; determining, with at least one processor, a plurality of cuisine type labels based on a plurality of merchant names associated with the plurality of payment transactions or a portion of the plurality of payment transactions, wherein a cuisine type label identifies a cuisine type provided by a respective merchant of the plurality of merchants; generating a merchant cuisine type model from the transaction data to determine a cuisine type label of a merchant, the merchant cuisine type model based on the transaction data, and makes an inference based on a combination of merchant or consumer features associated with a payment transaction of the plurality of payment transactions; and automatically predicting one or more cuisine type classifications using the merchant cuisine type model based on one or more payment transactions associated with a consumer. In some non-limiting embodiments or aspects, the transaction data associated with a payment transaction includes: data associated with an identification of a consumer controlling an account involved in the payment transaction; data associated with a name of a merchant involved in the payment transaction; data associated with a location of the merchant involved in the payment transaction; data associated with a time interval at which the payment transaction occurred; data associated with an authorized transaction amount of the payment transaction; and data associated with a settlement transaction amount of the payment transaction.

In some non-limiting embodiments or aspects, data from debit/credit card transactions, in which the transaction data does not have a large body of text, a large number of texts, and/or has limited information for inferring attributes, provides a set of business features which may be extracted from the transactions to generate cuisine type predictions. Some non-limiting embodiments or aspects of the present disclosure are effective at generating cuisine types for merchants and cuisine type classifiers using only merchant transaction data to ensure meaningful restaurant recommendations as they are based on information for understanding the cuisine type preferences of consumers. The merchant classification system provides, or more effectively and/or precisely provides, restaurant classification based on cuisine types generated in a closed system using merchant transaction data. For example, the merchant classification system can generate or provide, and/or more effectively and accurately generate or provide, cuisine types based on merchant transaction data to ensure awareness (e.g., identify, correlate, or infer consumer preferences for merchant cuisine types, etc.) of a user's cuisine preferences. In some non-limiting embodiments, the merchant classification system can provide, and/ or more effectively and accurately generate, cuisine types based on merchant transaction data to ensure awareness in other systems (e.g., latent factor models, collaborative filtering systems, etc.) that may not be aware of cuisine types. The non-limiting embodiments or aspects of the present disclosure automatically generate and/or more efficiently and accurately generate cuisine type labels based on cuisine classifications without using manually created labels and/or purchasing expensive, less accurate, and/or manually generated cuisine labels. The merchant classification system generates, and/or more effectively and accurately generates, cuisine type labels based on merchant transaction data to ensure awareness of a user's cuisine preferences for classifying one or more merchants. The embodiments of the present disclosure provide, and/or more efficiently and accurately provide, a framework for determining a taxonomy used for classifying merchant transactions based on inferences and/or correlations in merchant transaction data to ensure awareness of a user's preferences other than cuisine type (e.g., location preferences, seasonal preferences, tipping preferences, duration, ambiance of a location, etc.). Accordingly, a transaction service provider, a financial institution, and/or a merchant may communicate an offer that is more specifically targeted with a personalized restaurant recommendation based on cuisine type classification generated in a closed system (e.g., no outside supervision, etc.) and/or reduce consumption of network resources and processing resources associated with classifying a merchant based on cuisine types by using merchant transaction data.

Referring now to FIG. 1, FIG. 1 is a diagram of an example of environment 100, including a system for generating cuisine type predictions about a merchant (e.g., a restaurant, a fast food chain, a concession stand, caterer, food vendor, etc.) according to non-limiting embodiments or aspects. A cuisine type classification system 102 is in communication with a payment network to receive transaction data for payment transactions. The cuisine type classification system 102 includes one or more computers, such as servers, user terminals, processors, and/or the like, and a cuisine label generator 104 to generate cuisine types. For example, cuisine label generator 104 may include compiled programming instructions to create a taxonomy and cuisine labels for a taxonomy of restaurants based on cuisine type, either automatically, or in other non-limiting embodiments or aspects in a supervised manner (e.g., a weakly supervised manner, etc.) that can be used by the classification system 102 for classifying merchants. In some non-limiting embodiments or aspects, cuisine label generator 104 uses seed words (e.g., a set of words that are selected to initiate a training process, words representing different cuisines for initiating a label generation, etc.) as common patterns to create cuisine labels based on restaurant names. For example, cuisine label generator 104 may generate a classification for an Indian cuisine type if the word "Bombay" appears in the name of the restaurant or a Mexican cuisine type classification if the word "Tampico" appears in the name of the restaurant.

The cuisine label generator 104 uses (e.g., obtains, determines, receives, generates, etc.) cuisine information from restaurant names based on a pattern to generate classifiers. For example, cuisine label generator 104 extracts new words (e.g., beyond seed words, etc.) from restaurant names and uses them to generate cuisine types that can serve as highly accurate cuisine type patterns to increase the percentage of labeled restaurants. The cuisine label generator 104 also satisfies one or more criteria as secondary patterns to create cuisine labels for additional restaurant names.

With continued reference to FIG. 1, a classifier constructor 106 is in communication with a cuisine label generator 104 through a network environment, such as any direct or indirect network, or in other non-limiting embodiments or aspects, a public network such as the Internet. The classifier constructor 106 includes one or more computers, such as servers, user terminals, processors, and/or the like and a cuisine label generator 104 to provide a system (e.g., server, processor, etc.) for constructing (e.g., training, etc.) a merchant cuisine type model 112 using extracted features and/or embedded features. The classifier constructor 106 generates (e.g., initiates a learning process to train, fit, create, etc.) a model (e.g., a neural network, etc.) to classify restaurants into different cuisine types using extracted features and/or embedded features. For example, classifier constructor 106 may be configured to receive output from an embeddings extractor 108 or a feature extractor 110, and as explained further below, performs additional operations on the embeddings and feature output, such as, but not limited to, combining a plurality of embeddings and/or features to determine a cuisine type.

In some non-limiting embodiments or aspects, the embeddings extractor 108 may include compiled program instructions capable of being executed to generate embeddings to output to classifier constructor 106, such as, for example, to automatically generate (e.g., automatically, without supervision, etc.) embedding documents to capture multiple degrees (e.g., dimensions, etc.) of similarity amongst restaurants. Embeddings extractor 108 may use models (e.g., word2vec, syntactic, and semantic patterns that can be reproduced from transaction data related to a customer-restaurant interaction, etc.) to characterize transaction data based on co-occurrence, frequency, or context of words in a document or payment transaction. For example, embeddings extractor 108 may generate embeddings for a merchant (e.g., a restaurant, etc.) based on a customer-restaurant transaction. The embeddings extractor 108 generates a document for words used in the documents of the transaction. For example, in some non-limiting embodiments or aspects, a consumer may be represented by a document, while data from the payment transaction performed by the consumer may correspond to the words in the document, such as, for example, the merchant names associated with purchases made at restaurants.

In some non-limiting embodiments, embeddings extractor 108 generates embeddings (e.g., characteristics) for each merchant name based on a customer-restaurant interaction. The embeddings extractor 108 interprets payment transactions and uses the interpretation to represent or identify (e.g. use, process, record, etc.) each merchant name as a word (e.g., numerically represents the merchant names, generates a token, etc.), such that, in some non-limiting embodiments or aspects, each payment transaction of a consumer appears in one document (e.g., a consumer's ledger of restaurants, etc.) and each merchant name (e.g., a restaurant, food vendor, etc.) associated with a payment transaction of the consumer corresponds to a word associated with the document (e.g. a consumer's ledger). In some non-limiting embodiments or aspects, the words may be chronologically arranged, as per the day and time of transactions, to include further information. After creating the documents, embeddings extractor 108 generates word embeddings based on these documents using models, where words refer to restaurants, and consequently the word embeddings returned by the model are restaurant embeddings. These automatically generated restaurant embeddings capture the semantic similarity amongst restaurants and/or consumers, in terms of their location, cuisine type, price range, etc.

The feature extractor 110 may include compiled program instructions capable of being executed to generate merchant features to output to classifier constructor 106 by accumulating data and generating business features (e.g., real-time business information relating to aspects of a merchant, etc.). The feature extractor 110 receives transaction data output from a payment network associated with one or more payment exchanges of a merchant (e.g., restaurant, food vendor, etc.) to generate embedded feature extractions. Feature extractor 110 may receive transaction data including a cardholder ID, a merchant name, a merchant location, a day and time of a transaction, an authorized amount, or a settlement amount. The feature extractor 110 is configured to generate (e.g., extracts, determines, etc.) several features that correlate (e.g., accommodate, account for, etc.) merchant data (e.g., metrics, factors, profile information, menu information, time information, etc.) by accumulating business information about the merchants.

In some non-limiting embodiments or aspects, for each merchant, feature extractor 110 generates lists that include (e.g., contains) one or more data fields including information about the restaurant. For example, feature extractor 110 generates one or more of the following extracted or accumulated business features: an authorized amount percentile per payment transaction for the at least one first merchant; a tip percentile per payment transaction for the at least one first merchant; an hourly transaction percentile based on a number of payment transactions conducted in an hourly time interval for the at least one first merchant; a party size distribution per payment transaction for the at least one first merchant; a mean cost per payment transaction based on expected party size for the at least one first merchant; a distribution of a number of payment transactions conducted based on days-of-week for the at least one first merchant; a distribution of a number of transactions conducted based on hours-of-day during a weekday for the at least one first merchant; a distribution of a number of transactions conducted based on hours-of-day during a weekend day for the at least one first merchant; and/or the like.

With continued reference to FIG. 1, classifier constructor 106 may include compiled program instructions capable of being executed to train a merchant cuisine type model 112 for providing a machine learning network configured to provide parallel input paths (e.g., a plurality of parallel paths, etc.) corresponding to different features, and in other non-limiting embodiments or aspects, different embeddings. To model the interaction within or among features, classifier constructor 106 may be programmed to combine (e.g., concatenate, multiply, join, etc.) feature extractions and embedded extractions. For example, classifier constructor 106 joins all manually-extracted features (e.g., concatenates all manually-extracted features after passing each through a hidden layer, etc.) and joins them (e.g., multiplies them, etc.) to the combined layer (e.g., the extracted business features, etc.) of other layers passed to the model (e.g., passed by a hidden layer, etc.).

In some non-limiting embodiments or aspects, cuisine label generator 104 generates a cuisine type label by determining a word (e.g., selecting a word, etc.) that satisfies a combination of one or more selection criteria (e.g., a support criteria, a confidence criteria, a significance criteria, etc.). For example, cuisine label generator 104 selects a word (e.g., one or more words) based on a support criteria if the word is supported in at least a threshold number of restaurant names (e.g., support by a percentage, a threshold number, etc.). In another example, cuisine label generator 104 selects a word based on a confidence criteria if the word and a cuisine type label associated with the word (e.g. associated as a rule for the majority of labeled restaurants, etc.) are equal for at least a number of labeled merchants (e.g., confidence based on a percentage of labeled merchants, a threshold number, etc.). In a further example, cuisine label generator 104 selects a word based on a significance criteria if the ratio of labeled merchants and unlabeled merchants that contain the word are at least within a threshold of the other (e.g., significant based on a percentage above, a percentage below, etc.).

Still referring to FIG. 1, in some non-limiting embodiments or aspects, merchant cuisine type model 112 predicts a merchant cuisine type for a merchant based on merchant transaction data associated with one or more payment transactions. In some non-limiting embodiments or aspects, merchant cuisine type model 112 may receive the transaction data through the embeddings extractor 108 and/or the feature extractor 110 after features and embeddings have been generated. The merchant cuisine type model 112 generates an output including at least one merchant cuisine type classification, in some non-limiting embodiments or aspects, by a resultant layer being transformed to an output layer by sending the resultant layer through two hidden network layers and/or applying SoftMax activation. Merchant cuisine type model 112 generates and communicates output data to a remote server or a payment network, such as a payment processor that provides consumer services or offerings based on the output data, including customer recommendations or detections of credit card fraud or misuse. In some non-limiting embodiments or aspects, the remote server provides services with an increased measurable performance over other fraud detection and loyalty program systems.

In some non-limiting embodiments or aspects, cuisine type classification system 102 includes a network including one or more wired and/or wireless networks. For example, merchant cuisine type model 112 may include a cellular network (e.g., a long-term evolution (LTE) network, a third generation (3G) network, a fourth generation (4G) network, a fifth generation network (5G), a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of cuisine type classification system 102 may perform one or more functions described as being performed by another set of devices of cuisine type classification system 102.

Figure 2:
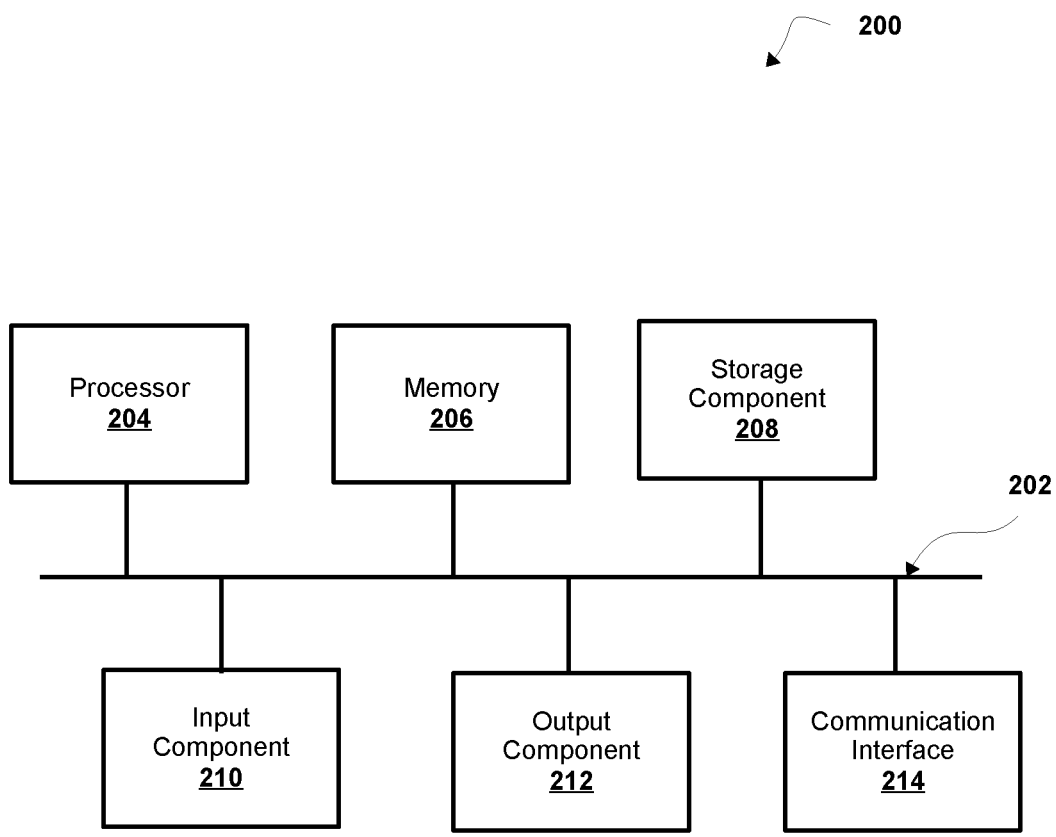
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of cuisine type classification system 102, and/or one or more devices of cuisine label generator 104, classifier constructor 106, embeddings extractor 108, feature extractor 110, and/or merchant cuisine type model 112. In some non-limiting embodiments or aspects, cuisine type classification system 102, cuisine label generator 104, classifier constructor 106, embeddings extractor 108, feature extractor 110, and/or merchant cuisine type model 112 may include at least one device 200 and/or at least one component of device 200.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
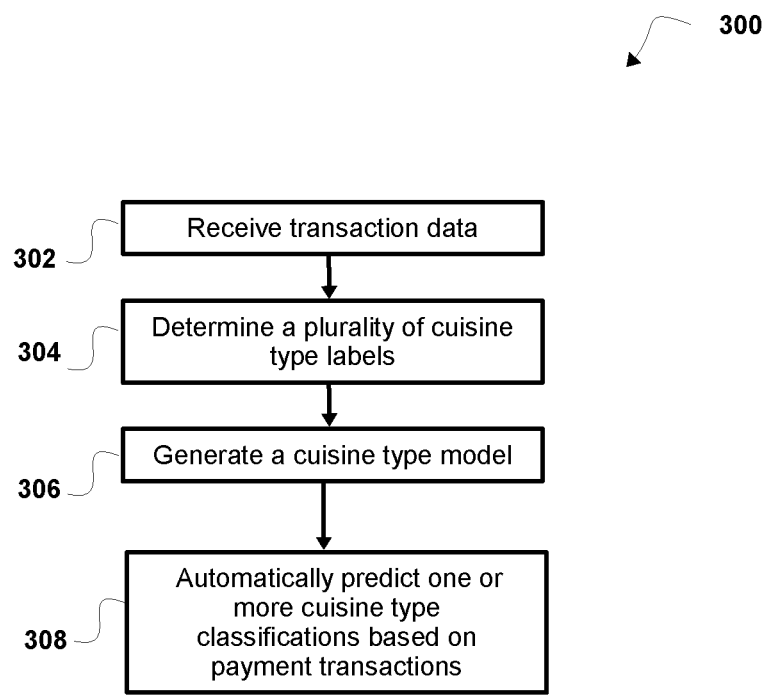
FIG. 3 is a flowchart illustrating a non-limiting embodiment of a merchant classification method for generating cuisine types for merchants and cuisine type classifiers using only merchant transaction data.

Referring now to FIG. 3, FIG. 3 is a flowchart of a non-limiting embodiment or aspect of a process 300 for determining cuisine type classifiers based on merchant data. In some non-limiting embodiments or aspects, one or more of the steps of process 300 may be performed (e.g., completely, partially, and/or the like) by cuisine label generator 104, classifier constructor 106, embeddings extractor 108, feature extractor 110, and/or merchant cuisine type model 112. In some non-limiting embodiments, one or more of the steps of process 300 may be performed (e.g., completely, partially, and/or the like) by another system, another device, another group of systems, or another group of devices separate from or including one or more of cuisine type classification system 102, cuisine label generator 104, classifier constructor 106, embeddings extractor 108, feature extractor 110, and/or merchant cuisine type model 112 (e.g., one or more devices of cuisine label generator 104, one or more devices of classifier constructor 106, one or more devices of embeddings extractor 108, one or more devices of feature extractor 110, and/or one or more devices of merchant cuisine type model 112).

As shown in FIG. 3, at step 302, process 300 includes receiving transaction data. For example, cuisine label generator 104 receives transaction data associated with a plurality of payment transactions involving a plurality of merchants and a plurality of consumers.

In some non-limiting embodiments or aspects, cuisine type classification system 102 receives transaction data associated with each payment transaction of a plurality of payment transactions involving a plurality of merchants including data associated with an identification of a consumer controlling an account involved in the payment transaction, data associated with a merchant (e.g., a merchant name, merchant token, merchant ID, merchant tag, etc.) involved in the payment transaction, data associated with a location of the merchant involved in the payment transaction, data associated with a time interval at which the payment transaction occurred, data associated with an authorized transaction amount of the payment transaction, or data associated with a settlement transaction amount of the payment transaction.

As shown in FIG. 3, at step 304, process 300 includes determining a plurality of cuisine type labels. For example, cuisine type classification system 102 determines a plurality of cuisine type labels based on a plurality of merchant names associated with the plurality of payment transactions or a portion of the plurality of payment transactions, wherein a cuisine type label identifies a cuisine type provided by a respective merchant of the plurality of merchants. The cuisine taxonomy comprises a predefined number of major cuisine types (e.g., 10 major cuisine types, etc.) and is limited or filtered to include only merchants that are popular in a certain geographic region (e.g., the United States, etc.), including global and regional (ethnic) cuisines. Cuisine types can be generated to accommodate fine-grained cuisine types.

In some non-limiting embodiments or aspects, a cuisine taxonomy for restaurant classification includes categories to cover all food types, or in other embodiments or aspects, includes only a portion of cuisine types, such as those active in a geographic region as depicted in the following Table 1:

TABLE 1

| Cuisine type and related category. | |
| --- | --- |
| Latin American | Mexican, Cuban, Brazilian, Colombian |
| European | French, Italian, German, Polish, Irish |
| Mediterranean | Greek, Turkish |
| Middle Eastern | Saudi Arabian, Lebanese, Persian, Afghan |
| African | Moroccan, Ethiopian, Eritrean |
| South Asian | Indian, Pakistani, Nepalese, Bangladeshi |
| Southeast Asian | Thai, Vietnamese, Indonesian, Malaysian |
| East Asian | Chinese, Japanese, Korean, Mongolian |
| Grill and Steak | Grill, Steakhouse |
| Fast food | Sandwich, Burger, Pizza |
| Bar | Bar, Pub, Tavern, Inn |
| Dessert | Ice Cream, Cafe, Bakery, Juice |

In some non-limiting embodiments or aspects, the cuisine label generator 104 determines a plurality of seed words (e.g., one or more seed words for initiating the cuisine label generator 104, etc.) for different cuisine types in the cuisine type taxonomy. For example, a small set of seed words may be generated that represent the different cuisines, such that they may be used as common patterns to generate cuisine labels based on restaurant names. A list of seed words that represents major cuisine types may be created and can include sub-divided cuisine types to further add to the cuisine type labels.

To generate and augment common patterns for predicting cuisine type labels, cuisine label generator 104 extracts new keywords from restaurant names and executes topic models to represent restaurant names. New keywords (e.g., words beyond those that are already seed words, etc.) may be generated by applying patterns to extract keywords from the restaurant names that can be used to increase the coverage (e.g., inclusion, consideration, etc.) of labeled restaurants. A cuisine label distribution for each new word is determined based on the labeled restaurants and then matched with one or more criteria to ensure reliable and accurate seed words (e.g., a support criteria, a confidence criteria, a significance criteria, etc.). For example, cuisine label generator 104 selects a word (e.g., one or more words) based on criteria that the word is supported in at least a threshold number of restaurant names (e.g., supported by a percentage, a threshold number, etc.). In another example, cuisine label generator 104 selects a word based on a confidence criteria if the word and a cuisine type label associated with the word (e.g. associated as a rule for the majority of labeled restaurants, etc.) are equal for at least a number of labeled merchants (e.g., confidence criteria based on a percentage of labeled merchants, a threshold number, etc.). In a further example, cuisine label generator 104 selects a word based on a significance criteria if the ratio of labeled merchants and unlabeled merchants that contain the word are at least within a threshold of the other (e.g., significance criteria based on a percentage above, a percentage below, etc.). In some non-limiting embodiments or aspects, cuisine label generator 104 uses the words that satisfy one or more criteria as secondary patterns to create cuisine labels for more restaurant names.

To further augment the keywords, cuisine label generator 104 may use a variety of additional topic models to process the restaurant names (e.g., as a bag of words, as a document of words, etc.). In this way, topic models can be used to overcome problems that are encountered when working with restaurant names which result in incoherent topics or cuisine classes, or include at least one of three key challenges. The first of the three is the monolith challenge where many restaurant names consist of a single word. The second is the sparsity challenge where co-occurrence patterns in restaurant names are sparse. The third is the skewness challenge where a skewness of words appearing in restaurant names occurs (e.g., a measure of the asymmetry of the probability distribution, etc.). To address the sparsity challenge, in some embodiments or aspects, cuisine label generator 104 provides a biterm topic model to learn topics by directly modeling the generation of word co-occurrence patterns (e.g., biterms). To address the skewness challenge, cuisine label generator 104 performs stratified sampling on biterms before passing them to BTM (e.g., divide the population into separate groups called strata before drawing a probability sample, such as a simple random sample, from each strata, etc.) and provide advantages over simple random sampling. Finally, to address the monolith challenge, cuisine label generator 104 sprinkles (e.g., mixes, adds, etc.) artificial words into the restaurant names. In this way, cuisine label generator 104 may provide more coherent resultant topics or cuisine classes that are consistent with the cuisine types generated (e.g., cuisine classes, etc.).

In some non-limiting embodiments or aspects, a topic model may be used to provide meaningful cuisine classes without keyword generation. However, for efficiency and accuracy, and to reduce and/or eliminate manual actions, in other non-limiting embodiments or aspects, both techniques are used to provide meaningful cuisine classes in a way that does not require manual curation, manual parameter tuning (e.g., how many cuisine classes), nor manual inspection to generate a reasonable taxonomy. This also decreases the chances of missing minority cuisine classes such as Ethiopian.

As shown in FIG. 3, at step 306, process 300 includes generating a cuisine type model. For example, cuisine type classification system 102 (e.g., one or more computers of classifier constructor 106, etc.) generates a merchant cuisine type model 112 from the transaction data to determine a cuisine type label of a merchant, or to further provide an inference based on one or more merchant or consumer features associated with a payment transaction of the plurality of payment transactions. For example, in some non-limiting embodiments or aspects, classifier constructor 106 receives a combination of one or more merchant or consumer features to generate the merchant cuisine type model 112 that may include merchant features, consumer features, or word embeddings based on the transaction data.

In some non-limiting embodiments or aspects, cuisine constructor 106 receives a merchant feature (e.g., a plurality of accumulated merchant features, business features, etc.) based on transaction data of payment transactions involving one or more merchants. For example, cuisine type classification system 102 (e.g., one or more computers of embeddings extractor 112, one or more computers of feature extractor 110, etc.) generate, store, or communicate a merchant feature (e.g., a plurality of accumulated merchant features, business features, etc.) generated from payment transactions (e.g., transaction data, information generated from transaction data, etc.) involving one or more merchants. The payment transactions (e.g., a dataset, etc.) may not include any explicit information about merchants (e.g., restaurants, etc.), with the exception of a merchant name and/or a merchant location that may be used by cuisine type classification system 102. Cuisine type classification system 102 sends the merchant features to the classifier constructor 106 where they are used in one or more layers of a neural network (e.g., a deep neural network, etc.) to classify a merchant based on the cuisine type taxonomy.

In some non-limiting embodiments or aspects, classifier constructor 106 receives, and may generate, a model based on two types of features from available transaction data, or in some non-limiting embodiments or aspects, the two types of features are used by merchant cuisine type model 112 to predict cuisine type labels for a merchant. The merchant features are extracted to generate or capture business information about restaurants and the embeddings (e.g., merchant characteristics, consumer characteristics, etc.) and/or further generate or capture inherent characteristics of merchants (e.g., restaurants, etc.) based on consumer-merchant interactions. The business features and embeddings provide valuable and precise inputs associated with features and characteristics of merchants, consumers, and transactions that have been shown through empirical data and further may provide accurate and beneficial results for restaurant classifications. The features encompass a wide range of business information about restaurants, such as location, business hours, pricing information, tipping culture, serving capacity, expected party size, consumer visitation patterns, and consumer loyalty.

With continued reference to step 306 of FIG. 3, feature extractor 110 generates several types of merchant features, such as, one or more of an authorized amount percentile per payment transaction for at least one specified merchant of a plurality of merchants, a tip percentile per payment transaction for the at least one specified merchant, an hourly transaction percentile based on a number of payment transactions conducted in an hourly time interval for the at least one specified merchant, a party size distribution per payment transaction for the at least one specified merchant, a mean cost per payment transaction based on expected party size for the at least one specified merchant, a distribution of a number of payment transactions conducted based on a day-of-week (e.g., Saturday, Sunday, Monday, etc.) for the at least one specified merchant, a distribution of a number of transactions conducted based on an hour-of-day (e.g., a number of hours, a period of a day, etc.) during a weekday for the at least one specified merchant, a distribution of a number of transactions conducted based on hours-of-day during a weekend day for the at least one specified merchant, and/or the like.

In some non-limiting embodiments or aspects, feature extractor 110 generates a pricing feature to capture pricing details by generating or extracting the deciles of authorized amounts for each restaurant (e.g., the 0th, 10th, 20th, 30th, 40th, 50th, 60th, 70th, 80th, 90th, and 100th percentiles of price values, authorized amounts, etc.). The pricing feature may be used as an inherent measurement to show how prices of different cuisines are related or fluctuate over time, and in some non-limiting embodiments or aspects, may be used to demonstrate a price inequality amongst or between cuisine types (e.g., people in geographic areas of the United States pay more for European cuisines as compared to East Asian or South Asian cuisines, etc.).

In some non-limiting embodiments or aspects, feature extractor 110 generates a tipping feature to capture the tipping behavior for a restaurant by extracting the deciles of the difference between settlement amount and authorized amount (e.g., the 0th, 10th, 20th, 30th, 40th, 50th, 60th, 70th, 80th, 90th, and 100th percentiles of tip values based on a settlement amount after removing the authorized amount, etc.). Tipping features include information that may vary across restaurant types, such as, for example, when fine dining restaurants have different norms as compared to fast food restaurants. Tipping features may be used to identify cuisine types based on bias towards different types of cuisines and how such biases affect gratuities.

In some non-limiting embodiments or aspects, feature extractor 110 generates a serving capacity feature to capture the serving capacity of a restaurant by extracting the deciles of the number of transactions per hour (e.g., hourly transaction percentiles for the 0th, 10th, 20th, 30th, 40th, 50th, 60th, 70th, 80th, 90th, and 100th percentiles of the number of transactions in an hour, excluding the hours with no transaction occurring, etc.). The serving capacity feature and serving efficiency feature may be used for determining a size or style of a merchant. For example, fast food restaurants may have higher serving speed compared to the fine dining cuisine types.

In some non-limiting embodiments or aspects, feature extractor 110 generates a party size feature (e.g., the fraction of transactions that involve a single person, a party of two, etc.). Party size composition may be used to determine a type of restaurant, such as for Chinese restaurants in Indiana where the majority (57%) of consumers dined with a party size of two. In some examples, transaction data may not include explicit information for party size, however, when the bill is split among members of a group, feature extractor 110 may be used to generate an association between member transactions based on other merchant features. Alternatively, if a bill is paid by one of the members, and no explicit information about the party size exists, party size is estimated based on a billing amount (e.g., an authorized amount, etc.). To estimate party size from billing amount, feature extractor 110 may perform a Gaussian mixture model (GMM) on the authorized amounts for a restaurant to provide a weighted sum of K components Gaussian densities, as given by the equation: $p(\chi|\theta)=\Sigma_{i=1}^{K}\phi_i N(\mu_i,\sigma_i)$, where x is the vector of authorized amounts, $\phi_i$ is the mixture weight (prior probability) of i-th component, and $N(\mu_i,\sigma_i)$ is the Gaussian density of i-th component. To determine the number of components K, we use a metric (e.g., the Akaike information criterion, etc.) to capture the trade-off between model complexity and goodness-of-fit, such as, for example, using the proportion of transactions for different party size ($\Phi=\{\phi 1, \ldots, \phi K\}$) and the average authorized amount for different party size ($M=\{\mu 1, \ldots, \mu K\}$) as party composition features.

In some non-limiting embodiments or aspects, feature extractor 110 generates temporal pattern features to capture the temporal patterns of a restaurant. By extracting the distribution of transactions over the days-of-week (e.g., Saturday, Sunday, Monday, etc.) or the hours-of-day (e.g., morning, noon, nighttime, etc.), cuisine type information is generated, such as, for determining a diner (e.g., based on weekend morning hours, etc.), a bar (e.g., based on weekend evening and early morning hours), or an upscale restaurant (by weekends only, etc.). To allow such features, hours-of-day may be further divided into hours-of-weekday and hours-of-weekend, and can further include business hours and busy times. Temporal pattern features may provide merchant features used for understanding a restaurant's business (e.g., bars typically operate during night time, brunch spots operate during day time, etc.). Feature extractor 110 may be programmed to filter or specify temporal patterns for further efficiency in learning or predicting, such as, to only include specified times and days, for example, business hours on weekend days or busy times on one or more specified weekdays.

In some non-limiting embodiments or aspects, feature extractor 110 generates consumer returns (e.g., revisits, repeats, etc.) to capture the consumer return tendency for a merchant by extracting the deciles of number of revisits (e.g., repeat transactions, etc.) by the consumers. Consumer returns may be used by feature extractor 110 to determine the importance of differences in first-time consumers and repeat consumers when a correlation exists between a cuisine type and the number of return visitations of consumers.

In some non-limiting embodiments or aspects, feature extractor 110 generates a consumer loyalty feature to extract the loyalty information relating to consumers of a restaurant. Feature extractor 110 may generate or provide the deciles of the number of restaurants visited by the consumers. The consumer loyalty feature provides consumer loyalty information for understanding consumer types and their endemic characteristics.

In some non-limiting embodiments or aspects, feature extractor 110 generates a location feature for characterizing a merchant. Merchant businesses are often established based on a preference of potential consumers for a locality. Feature extractor 110 may extract a zip code and the corresponding location granularity to capture the locality of a restaurant.

Still referring to step 306 of FIG. 3, embeddings extractor 108 may also generate and provide several types of embedding features to the classifier constructor 106. For example, when making an inference or generating a model, merchant or consumer embeddings associated with one or more payment transactions may be used by classifier constructor 106 or merchant cuisine type model 112. For example, classifier constructor 106 or merchant cuisine type model 112 may determine a similarity based on the payment transactions between merchant embeddings (e.g., merchant characteristics, etc.) and consumer embeddings (e.g., consumer characteristics, etc.). Through the use of a merchant embedding, any merchant (e.g., restaurant, etc.) may be represented in a lower-dimensional space based on an inherent structure imposed by restaurant characteristics, such as cuisine type, price range, and restaurant location. Likewise, through the use of a consumer embedding, consumers may be represented in a lower dimensional space based on consumer traits, such as cuisine affinity, price/grade sensitivity, or consumer location. The payment transactions are samples from these two spaces where certain interactions are plausible, while others are unlikely to occur. In this way, by generating, providing, and using related observations, at a micro and macro level, a plausibility of a consumer-restaurant interaction may be determined.

Embeddings may be determined through a representation of the restaurants in a dense and low-dimensional space based on consumer-restaurant interactions. For example, the embeddings extractor 108 determines consumer compatibility with a merchant based on merchant attributes by encoding a plurality of consumer characteristics (e.g., embeddings, such as merchant embeddings of a consumer, etc.) that may have similarities with characteristics of other respective consumers (e.g., other consumer characteristics, etc.) with respect to a particular merchant. The consumer characteristics are then used to determine compatibility between consumers and restaurants. For example, the compatibility between consumer characteristics (e.g., embeddings, attributes, or preferences for cuisine types, based on taste, cost, location, efficiency, etc.) and merchant characteristics are used to predict whether a consumer may visit a different merchant in the future. The embeddings extractor 108 determines the similarities between a consumer and a merchant to make a correlation between the consumer and the merchant based on a comparison of the characteristics of the consumer (e.g., consumer characteristics based on merchant choices determined from payment transactions that show a likelihood the consumer is a vegetarian, etc.) with attributes of a merchant, either known or based on a plurality of consumer characteristics of one or more second consumers who visited the merchant (e.g., based on payment transactions of the plurality of second consumers who visited the other merchant, etc.) or existing attributes of the merchant. For example, it may be known, or in other non-limiting embodiments or aspects estimated, that a restaurant is a steakhouse if a threshold number of consumers who visit the merchant have a strong tendency to visit steakhouses. After making the determination, a prediction about the first consumer may be generated. For example, it is unlikely for a consumer who is a vegetarian to visit a steakhouse, or in another example, a strong likelihood may exist that a person who visits many steakhouses will visit another steakhouse.

Likewise, by encoding a plurality of consumer characteristics with respect to a merchant, the embeddings extractor 108 predicts merchant attributes based on the plurality of consumer characteristics and may then correlate a compatibility between consumers and the merchant. For example, the types of consumers who visit a restaurant are generally similar and a good predictor of the restaurant's attributes. For example, a restaurant is unlikely to be a steakhouse if a threshold number (e.g., a majority, etc.) of its consumers exhibit traits of a vegetarian. The embeddings extractor 108 determines, or provides the characteristics for determining, such a likelihood, by determining the characteristics of consumers who visit a merchant (e.g., a merchant characteristic) and encoding this information as merchant embeddings, such that consumer similarities for a respective merchant may be used to classify the restaurant. For example, if the embeddings extractor 108 determines a similarity (e.g., consumers of the restaurant are vegetarians, etc.) between the consumers (e.g., based on payment transactions, etc.), then the similar characteristics (e.g., similarities between a first consumer and one or more second consumers, many second merchants, etc.) may be attributed to the merchant (e.g., that a restaurant is unlikely to be a steakhouse, etc.).

In some non-limiting embodiments or aspects, embeddings extractor 108 learns such dense representations using one or more models (e.g., word2vec and its extension, doc2vec, etc.) to generate at least two distinct sets of restaurant embeddings are generated.

In one example, embeddings extractor 108 associates or generates a document for a consumer (e.g., a consumer may be represented as a document, etc.), and then associates or generates each restaurant visited by the consumer as a word of that document (e.g., each merchant is represented as a word of the consumer document, etc.). The embeddings extractor 108 identifies each transaction by a consumer as corresponding to a word (e.g., a merchant, restaurant, etc.) and appearing in a consumer document (e.g., the consumer's ledger of restaurants). In other non-limiting embodiments or aspects, these words may be generated in the document to appear chronologically (e.g., as per the day and time of transactions, etc.). After creating the documents, embeddings extractor 108 applies a model (e.g., word2vec, etc.) to restaurant embeddings on the documents such that the documents correspond to the consumer and the words refer to restaurants.

In another example, embeddings extractor 108 associates or generates a document for a merchant (e.g., represents each restaurant of a set of payment transactions as a respective document, etc.), and then associates or generates each consumer as a word of that document (e.g., each consumer is represented as a word of the merchant document, etc.), such that each payment transaction of a restaurant corresponds to a word (e.g., consumer, etc.) appearing in a document (e.g., the restaurant's ledger of consumers, etc.). In some non-limiting embodiments or aspects, these words may be generated or associated to have a chronological order, as per the day and time of transactions. After creating the documents, a model is applied (e.g., apply doc2vec, etc.) to these documents, which in some non-limiting embodiments or aspects may refer to restaurants, and consequently the document embeddings returned by doc2vec are restaurant embeddings.

In some non-limiting embodiments or aspects, embeddings extractor 108 generates name embeddings. Name embeddings are generated to use the remaining words in restaurant names. For example, embeddings extractor 108 removes words used in a keyword process as described in step 304 (e.g., removes words from restaurant names, etc.) to determine the remaining words from the merchant names, and then applies word embeddings (e.g., generates embeddings for restaurant names by combining the embeddings corresponding to the words of a restaurant name via a max pooling, etc.).

As shown in FIG. 3, at step 308, process 300 automatically predicts one or more cuisine type classifications based on payment transactions. For example, merchant cuisine type model 112 automatically predicts one or more cuisine type classifications using the merchant cuisine type model 112 based on one or more payment transactions associated with a consumer. In some non-limiting embodiments, merchant cuisine type model 112 determines a cuisine type label of the plurality of cuisine type labels for at least one second merchant of the plurality of merchants based on a word included the name of the at least one merchant involved in at least one payment transaction.

Figure 4:
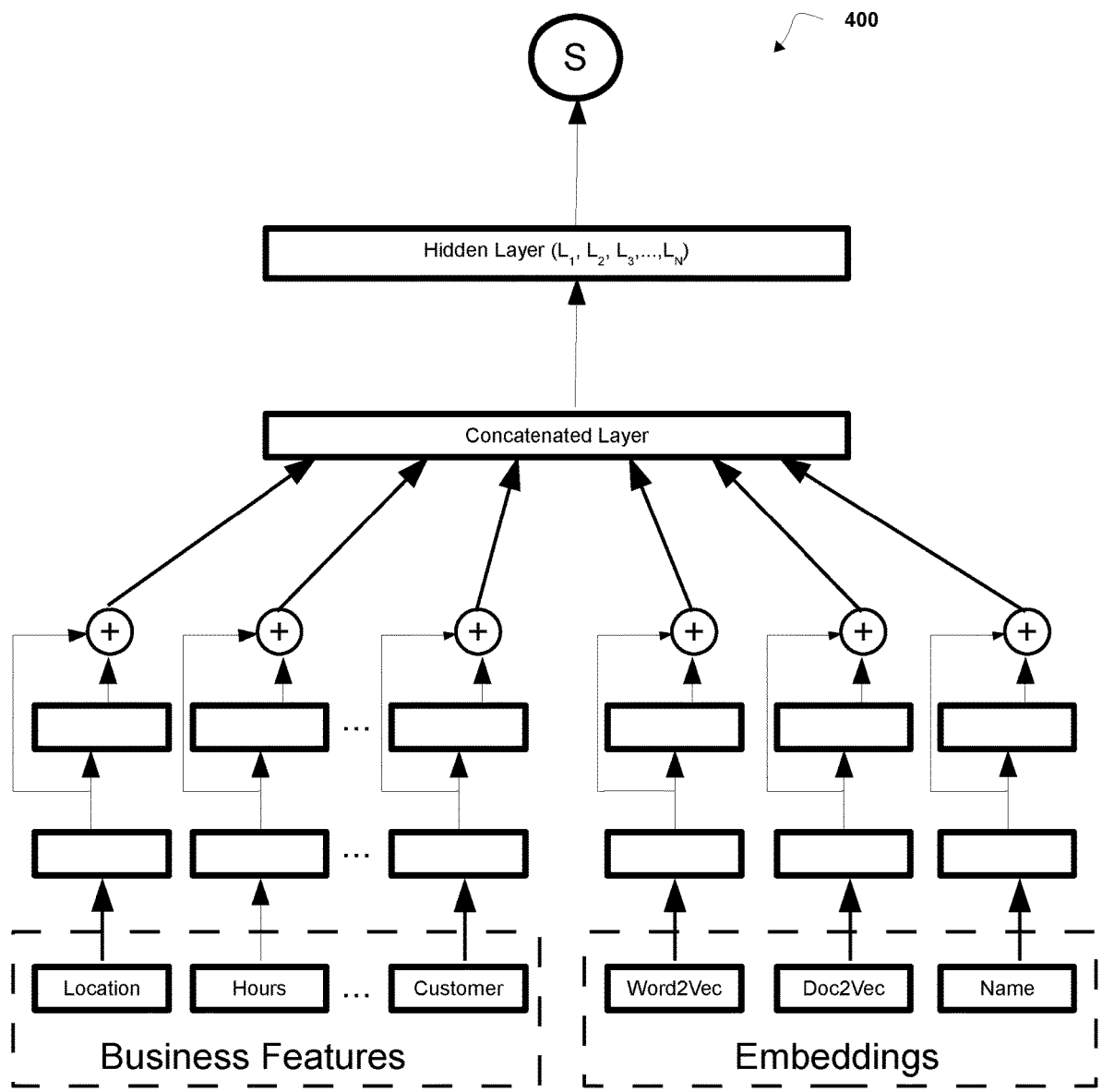
FIG. 4 is a diagram of a non-limiting embodiment or aspect of a classification model in which systems, apparatuses, and/or methods, as described herein, may be implemented

Referring now to FIG. 4, in some non-limiting embodiments or aspects, a deep learning neural network is used to classify the restaurants. As shown in FIG. 4, the neural network includes several parallel input paths, each corresponding to a different feature, such as, merchant features (e.g., business features as described above, etc.), and embeddings (e.g., consumer embeddings, merchant embeddings, name embeddings, etc.). First, merchant cuisine type model 112 receives and passes each of the different features (e.g., in the form of a set of vectors of real numbers) through two hidden layers, where the two layers have residual connections. Next, merchant cuisine type model 112 concatenates the resultant layers to create a single concatenated layer. Lastly, merchant cuisine type model 112 passes the concatenated layer through two hidden layers and applies a SoftMax activation to generate the output layer.

In some non-limiting embodiments or aspects, a training dataset may be provided from a set of debit/credit card transactions that can be used by classifier constructor 106 to train the model. Deep learning neural network models learn by iteratively mapping inputs to outputs given a training dataset of examples. The training process involves fitting parameters (e.g., weights of connections between neurons in the artificial neural network, etc.) in the network until it proves to be good, or good enough, at solving the specific problem. For example, classifier constructor 106 receives a training dataset and fits the parameters of the model as shown in FIG. 4, by inputting a first transaction to the model as an input vector to produce an output vector (e.g., a cuisine type label, etc.) that can be compared or scored based on a target (e.g., an expected value, etc.). This process may be repeated numerous times to continually adjust the parameters of the model. The training dataset (e.g., evaluation dataset, etc.) may include in-person restaurant transactions from a region, collected within a predefined time period (e.g., 3-month period, etc.). In the training dataset, there may be restaurants that can be excluded. In some non-limiting embodiments or aspects, weakly-supervised label generation based on the process for establishing keywords in step 304 is used to generate cuisine labels for some of these restaurants to use for training the merchant cuisine type model 112. The labeled restaurants are then split into training (80%) and testing (20%) sets for validation of the trained model.

In some non-limiting embodiments or aspects, a report is provided with the declined accuracy scores and the change in accuracy for all features (obtained by removing one feature at a time). The restaurant embeddings provide the most useful features for cuisine type prediction. Among the embeddings, the contribution of name embedding is most useful. The remaining words (that have not been used for labeling) in restaurant names could be strong indicators of cuisine type. The word2vec-based embedding that captures compatibility between a consumer and a restaurant is another strong indicator, implying that many consumers have a strong preference towards certain cuisine types. The macro-level doc2vec-based embedding is also useful in cuisine type prediction. Among the manual business features, temporal patterns play a key role in understanding cuisine type, followed by price, location, and consumer visitation patterns. An ablation study with features sorted based on a change in accuracy (compared to the model using all features) is depicted below in the subsequent Table 2.

TABLE 2

Ablation study results based on change in accuracy.

| Removed Feature | Accuracy (Change) |
|---|---|
| Name embedding | 0.689 (−0.073) |
| word2vec embedding | 0.720 (−0.042) |
| doc2vec embedding | 0.750 (−0.012) |
| Transactions over hours-of-weekend | 0.750 (−0.012) |
| Transactions over hours-of-weekday | 0.751 (−0.011) |
| Transactions over days-of-week | 0.751 (−0.011) |
| Price quantiles | 0.753 (−0.009) |
| Zip code based location hierarchy | 0.754 (−0.008) |
| Tips quantiles | 0.755 (0.007) |
| Revisitation quantiles | 0.755 (−0.007) |
| Average spending for party size | 0.756 (−0.006) |
| Consumer count quantiles | 0.757 (−0.005) |
| Affinity quantiles | 0.757 (−0.005) |
| Party size composition | 0.758 (−0.004) |

In some non-limiting embodiments or aspects, the impact of hyper-parameters is shown for several sets of hyper-parameters of the merchant cuisine type model 112 that have an impact on the overall performance. To determine the best configuration of hyper-parameters, a grid search over the space of parameters is performed. The key parameters affecting performance are batch size (lower batch size leads to significant improvement in performance) and the dimension of word2vec (the number of dimensions in word2vec significantly affects its contribution). A list of optimal configurations of hyper-parameters is depicted below in Table 3.

TABLE 3

Optimal configuration of hyper-parameters.

| Network Parameters | |
|---|---|
| Dropout | 0.0, 0.1, 0.2, 0.3 |
| Batch Size | 128, 256, 512, 1024 |
| Learning Rate | 0.001, 0.01, 0.1, 1.0 |
| word2vec Parameters | |
| Dimension | 50, 100, 200, 300 |
| Window Size | 5, 10, 20, 30 |
| Negative Sampling | 5, 10, 20, 30 |
| doc2vec Parameters | |
| Dimension | 50, 100, 200, 300 |
| Window Size | 50, 100, 200, 300 |
| Negative Sampling | 5, 10, 20, 30 |

In some non-limiting embodiments or aspects, after merchant cuisine type model 112 categorizes the merchants into different categories, a computing device coupled to the merchant cuisine type model 112 generates a cardholder profile (e.g., a cardholder signature, etc.) which may be used to detect a fraudulent transaction whenever a transaction does not follow the user's previous purchasing pattern. In this way, more labels may be provided for a dataset to increase the performance and accuracy of a fraud detection algorithm by automatically generating several additional labels for a merchant.

In some non-limiting embodiments or aspects, the output can be used for fraud detection, personalized recommendations, or finding a location for a new merchant. For example, the cuisine type for a restaurant can be used for fraud detection by generating a cuisine type signature for a cardholder associated with how frequently he/she visits (e.g., eats, dines, etc.) at each category of the restaurant. In some non-limiting embodiments or aspects, a cuisine signature may include: Cardholder X's signature={Italian=10, Mexican=2, Vietnamese=14, Chinese=3}, such that, during the processing of a restaurant transaction, the restaurant is aligned with the cardholder's cuisine signature, such that, based on deviations, a signal can be generated to identify when the transaction may be a fraudulent one.

In some non-limiting embodiments or aspects, the output can be used for personalized restaurant recommendation. For example, a recommendation engine can benefit from the metadata associated with the consumer or the restaurant. For a restaurant recommendation, the cuisine type of a restaurant is a valuable piece of information that can boost the performance of the recommendation engine in terms of recommending more relevant restaurants to users. Due to lack of labeled data, evaluation of a recommendation system is one of the most challenging components. This approach can help an evaluation platform compare the performance of different recommendation engines on a dataset. Manually generating the same amount of labels for restaurants would take a long time and cost millions of dollars considering the fact that millions of restaurants exist all over the world.

In some non-limiting embodiments or aspects, the output can be used for finding a location for a new merchant. For example, when a retailer wants to open a new store, labels generated by the merchant cuisine type model 112 can be used to find the best location. For example, labels for cuisine types can be used if Whole Foods seeks to open a new store in a neighborhood having several high-end Italian restaurants, or if a company like Marriot seeks to build a hotel in a neighborhood with several luxury clothing stores.

Although this algorithm is designed to classify restaurants based on their cuisines, the features that are generated and the classification approach that is introduced are general enough to capture other categorizations of merchants. For example, the approach can be used to classify clothing stores into high street brands (e.g., H&M, Gap, Kohl's, etc.) vs. luxury brands (e.g., Gucci, D&G, etc.), classify hotels into affordable, average, and luxury classes, classify tourist attractions into domestic vs. international, classify grocery stores into affordable vs. organic classes, and/or the like.

Although the above systems, methods, and computer program products have been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method for classifying restaurant types by applying a label to each restaurant according to its cuisine type using only restaurant payment transactions processed within a closed payment network system, the method comprising:
receiving, by at least one processor associated with a cuisine type label generator, transaction data of a plurality of payment transactions involving a plurality of restaurant merchants and a plurality of consumers, wherein each of the consumers holds an account with a payment network and each of the restaurant merchants are in electronic communication with a payment network computing device using a merchant computing device, wherein each of the consumers initiates restaurant payment transactions on a consumer mobile computing device which is in electronic communication with a merchant computing device;

determining, with the cuisine type label generator, a plurality of cuisine type labels based on a plurality of restaurant names associated with the plurality of payment transactions or a portion of the plurality of payment transactions, wherein a cuisine type label identifies a cuisine type provided by a respective merchant of the plurality of restaurant merchants, and wherein the cuisine type labels are generated automatically based on (i) a predefined number of cuisine types filtered to include only restaurants popular in a predefined geographic region; (ii) a predefined number of seed words; and (iii) keywords extracted from restaurant names which are supported by comparison to labeled restaurants;

receiving, by a cuisine type model generator, cuisine type labels generated by the cuisine type label generator;

receiving, by the cuisine type model generator, from a restaurant feature extractor, restaurant operating features extracted from the transaction data, wherein the restaurant operating features comprise empirically generated correlations between restaurant operating features and cuisine types, including one or more of restaurant location, business hours, pricing and tipping culture, expected party size, and consumer visitation and loyalty patterns;

receiving, by the cuisine type model generator, from an embedding computing device, a plurality of embedding features comprising consumer embedded features and merchant restaurant embedded features, wherein the embedding features comprise correlations between consumer characteristics and restaurants as to cuisine types, including one or more of taste, cost, location, and efficiency, the merchant restaurant embedded features and the consumer embedded features automatically generated from transaction data, wherein each consumer feature of the consumer embedded features is used to characterize transaction data based on at least one of co-occurrence, frequency, or context of one or more words in a payment transaction of a consumer, and the payment transaction is associated with a purchase at a merchant, and wherein one or more merchant features of the merchant restaurant embedded features include each consumer feature that is associated with a restaurant merchant from which the payment transaction of the consumer originated;

outputting, by the cuisine type model generator, to a restaurant cuisine type model, the restaurant operating features, consumer embedded features and merchant restaurant embedded features, wherein the restaurant cuisine type model combines the restaurant operating features with the consumer embedded features and merchant restaurant embedded features in a plurality of parallel input paths using a deep learning neural network to predict cuisine type labels, based on the labels generated by the cuisine type label generator for restaurant merchants associated with the transaction data;

training the restaurant cuisine type model, by the cuisine type model generator, using labeled restaurant names;

receiving, by the restaurant cuisine type model, in payment transaction data from the restaurant merchant computing device or the payment network computing device, a payment transaction initiated by the consumer mobile computing device;

automatically predicting, by the restaurant cuisine type model, one or more cuisine type labels using the restaurant cuisine type model based on the payment transaction associated with the consumer; and applying one or more of the cuisine type labels to the restaurant merchant and associating the cuisine type labels with the consumer.

2. The computer-implemented method of claim 1, further comprising:

generating, with at least one processor, a recommendation based on the one or more cuisine type labels.

3. The computer-implemented method of claim 1, further comprising:

detecting, with at least one processor, a payment fraud based at least partially on the one or more cuisine type labels.

4. The computer-implemented method of claim 1, wherein the transaction data associated with the payment transaction comprises at least one of:

data associated with an identification of the consumer controlling an account associated with the payment transaction;

data associated with the merchant in the payment transaction;

data associated with a location of the merchant in the payment transaction;

data associated with a time interval at which the payment transaction occurred;

data associated with an authorized transaction amount of the payment transaction; or data associated with a settlement transaction amount of the payment transaction.

5. The computer-implemented method of claim 1, further comprising:

determining a cuisine type label of the plurality of cuisine type labels for at least one merchant for the payment transaction of the consumer based on one or more characteristics in the payment transaction associated with the at least one merchant and the consumer.

6. The computer-implemented method of claim 5, further comprising:

determining merchant attributes by encoding a plurality of consumer embedded features of a respective plurality of consumers of the merchant;

determining consumer characteristics by encoding a plurality of restaurant merchant embedded features for the consumer; and determining compatibility between the merchant and the consumer based on the similarity of characteristics of the consumer to the merchant attributes.

7. The computer-implemented method of claim 6, wherein the merchant or consumer include business features comprising at least one of:

an authorized amount percentile per payment transaction for the merchant;

a tip percentile per payment transaction for the merchant;

an hourly transaction percentile based on a number of payment transactions conducted in an hourly time interval for the merchant;

a party size distribution per payment transaction for the merchant;
a mean cost per payment transaction based on expected party size for the merchant;
a distribution of a number of payment transactions conducted based on days-of-week for the merchant;
a distribution of a number of transactions conducted based on hours-of-day during a weekday for the merchant; or
a distribution of a number of transactions conducted based on hours-of-day during a weekend day for the merchant.

8. The computer-implemented method of claim 1, wherein determining the plurality of cuisine type labels comprises:
determining a label of a merchant name associated with the payment transaction by satisfying criteria including at least one of support, confidence, or a significance of a word within the merchant name of the plurality of restaurant merchants.

9. The computer-implemented method of claim 1, predicting the one or more cuisine type classifications using the restaurant cuisine type model, further comprises:
determining a plurality of merchant features based on transaction data associated with a portion of payment transactions of the plurality of payment transactions associated with the consumer.

10. A computing system for classifying restaurant types by applying a label to each restaurant according to its cuisine type using only restaurant payment transactions processed within a closed payment network system, comprising:
a cuisine type label generator including one or more processors programmed or configured to:
receive transaction data of a plurality of restaurant payment transactions involving a plurality of restaurant merchants and a plurality of consumers, wherein each of the consumers holds an account with a payment network and each of the restaurant merchants are in electronic communication with a payment network computing device using a merchant computing device, wherein each of the consumers initiates restaurant payment transactions on a consumer mobile computing device which is in electronic communication with a merchant computing device; and
determine a plurality of cuisine type labels based on a plurality of restaurant names associated with the plurality of payment transactions or a portion of the plurality of payment transactions, wherein a cuisine type label identifies a cuisine type provided by a respective merchant of the plurality of restaurant merchants wherein the cuisine type labels are generated automatically based on (i) a predefined number of cuisine types filtered to include only restaurants popular in a predefined geographic region; (ii) a predefined number of seed words; and (iii) keywords extracted from restaurant names which are supported by comparison to labeled restaurants; and
a cuisine type model generator including one or more processors programmed or configured to:
receive cuisine type labels generated by the cuisine type label generator;
receive from a restaurant feature extractor, restaurant operating features extracted from the transaction data, wherein the restaurant operating features comprise empirically generated correlations between restaurant operating features and cuisine types, including one or more of restaurant location, business hours, pricing and tipping culture, expected party size, and consumer visitation and loyalty patterns;
receive from an embedding computing device, a plurality of embedding features comprising consumer embedded features and merchant restaurant embedded features, wherein the embedding features comprise correlations between consumer characteristics and restaurants as to cuisine types, including one or more of taste, cost, location, and efficiency, the merchant restaurant embedded features and the consumer embedded features automatically generated from transaction data, wherein each consumer feature of the consumer embedded features is used to characterize transaction data based on at least one of co-occurrence, frequency, or context of one or more words in a payment transaction of a consumer, and the payment transaction is associated with a purchase at a merchant, and wherein one or more merchant features of the merchant restaurant embedded features include each consumer feature that is associated with a restaurant merchant from which the payment transaction of the consumer originated;
output to a restaurant cuisine type model, the restaurant operating features and the embedding features, wherein the restaurant cuisine type model combines the consumer features and the embedding features in a plurality of parallel input paths using a deep learning neural network to predict cuisine type labels, based on the labels generated by the cuisine type label generator, for restaurant merchants associated with the transaction data; and
train the restaurant cuisine type model by providing labeled restaurant names;
wherein the restaurant cuisine type model receives payment transaction data from the restaurant merchant computing device or the payment network computing device, a payment transaction initiated by the consumer mobile computing device,
automatically predicts one or more cuisine type labels using the restaurant cuisine type model based on the payment transaction associated with the consumer; and
applies one or more of the cuisine type labels to the restaurant merchant and associating the cuisine type labels with the consumer.

11. The computing system of claim 10, further configured to:
generate a recommendation based on the one or more cuisine type labels.

12. The computing system of claim 10, further configured to:
detect a payment fraud based at least partially on the one or more cuisine type labels.

13. The computing system of claim 10, wherein the transaction data associated with the payment transaction comprises at least one of:
data associated with an identification of the consumer controlling an account associated with the payment transaction;
data associated with the merchant in the payment transaction;
data associated with a location of the merchant in the payment transaction;
data associated with a time interval at which the payment transaction occurred;
data associated with an authorized transaction amount of the payment transaction; or data associated with a settlement transaction amount of the payment transaction.

14. The computing system of claim 10, further configured to:
determine a cuisine type label of the plurality of cuisine type labels for at least one merchant for the payment transaction of the consumer based on one or more characteristics in the payment transaction associated with the at least one merchant and the consumer.

15. The computing system of claim 14, further configured to:
determine merchant attributes by encoding a plurality of consumer embedded features of a respective plurality of consumers of the merchant;
determine consumer characteristics by encoding a plurality of merchant restaurant embedded features for the consumer; and
determine compatibility between the merchant and the consumer based on the similarity of characteristics of the consumer to the merchant attributes.

16. The computing system of claim 15, wherein the merchant or consumer are business features comprising at least one of:
an authorized amount percentile per payment transaction for the merchant;
a tip percentile per payment transaction for the merchant;
an hourly transaction percentile based on a number of payment transactions conducted in an hourly time interval for the merchant;
a party size distribution per payment transaction for the merchant;
a mean cost per payment transaction based on expected party size for the merchant;
a distribution of a number of payment transactions conducted based on days-of-week for the merchant;
a distribution of a number of transactions conducted based on hours-of-day during a weekday for the merchant; or
a distribution of a number of transactions conducted based on hours-of-day during a weekend day for the merchant.

17. The computing system of claim 10, wherein the one or more processors when determining the plurality of cuisine type labels are further configured to:
determine a label of a merchant name associated with the payment transaction by satisfying criteria including at least one of support, confidence, or a significance of a word within the merchant name of the plurality of restaurant merchants.

18. The computing system of claim 10, wherein the one or more processors predicting the one or more cuisine type classifications using the restaurant cuisine type model are further configured to:
determine a plurality of merchant features based on transaction data associated with a portion of payment transactions of the plurality of payment transactions associated with the consumer.

19. A computer program product including at least one non-transitory computer-readable medium including one or more instructions that, when executed by at least one processor, cause the at least one processor to:
receive transaction data of a plurality of restaurant payment transactions involving a plurality of restaurant merchants and a plurality of consumers, wherein each of the consumers holds an account with a payment network and each of the restaurant merchants are in electronic communication with a payment network computing device using a merchant computing device, wherein each of the consumers initiates restaurant payment transactions on a consumer mobile computing device which is in electronic communication with a merchant computing device;
determine a plurality of cuisine type labels based on a plurality of restaurant names associated with the plurality of payment transactions or a portion of the plurality of payment transactions, wherein a cuisine type label identifies a cuisine type provided by a respective merchant of the plurality of restaurant merchants, wherein the cuisine type labels are generated automatically based on (i) a predefined number of cuisine types filtered to include only restaurants popular in a predefined geographic region; (ii) a predefined number of seed words; and (iii) keywords extracted from restaurant names which are supported by comparison to labeled restaurants;
receive cuisine type labels generated by the cuisine type label generator;
receive restaurant operating features extracted from the transaction data, wherein the restaurant operating features comprise empirically generated correlations between restaurant operating features and cuisine types, including one or more of restaurant location, business hours, pricing and tipping culture, expected party size, and consumer visitation and loyalty patterns;
receive a plurality of embedding features comprising consumer embedded features and merchant restaurant embedded features, wherein the embedding features comprise correlations between consumer characteristics and restaurants as to cuisine types, including one or more of taste, cost, location, and efficiency, the merchant restaurant embedded features and the consumer embedded features automatically generated from transaction data, wherein each consumer feature of the consumer embedded features is used to characterize transaction data based on at least one of co-occurrence, frequency, or context of one or more words in a payment transaction of a consumer, and the payment transaction is associated with a purchase at a merchant, and wherein one or more merchant features of the merchant restaurant embedded features include each consumer feature that is associated with a restaurant merchant from which the payment transaction of the consumer originated;
output to a restaurant cuisine type model, the restaurant operating features and embedding features, wherein the restaurant cuisine type model combines the restaurant operating features and embedding features in a plurality of parallel input paths using a deep learning neural network to predict cuisine type labels, based on the labels generated by the cuisine type label generator, for restaurant merchants associated with the transaction data;
train the restaurant cuisine type model by providing labeled restaurant names;
receive payment transaction data from the restaurant merchant computing device or the payment network computing device, a payment transaction initiated by the consumer mobile computing device;
automatically predict one or more cuisine type labels using the restaurant cuisine type model based on the payment transaction associated with the consumer; and
apply one or more of the cuisine type labels to the restaurant merchant and associating the cuisine type labels with the consumer.

20. The computer program product of claim 19, wherein the at least one non-transitory computer-readable medium further includes one or more instructions that, when executed by at least one processor, cause the at least one processor to:
    determine a cuisine type label of the plurality of cuisine type labels for at least one merchant for the payment transaction of the consumer based on one or more characteristics in the payment transaction associated with the at least one merchant and the consumer.

\* \* \* \* \*